Patented Nov. 11, 1947

2,430,804

UNITED STATES PATENT OFFICE 2,430,804

PURIFICATION OF 3-PICOLINE

Francis E. Cislak and William R. Wheeler, Indianapolis, Ind., assignors to Reilly Tar & Chemical Corporation, Indianapolis, Ind., a corporation of Indiana No Drawing. Application March 25, 1942,
Serial No. 436,169

17 Claims. (Cl. 260—290)

Our invention relates to the purification of 3-picoline from such contaminants as 4-picoline and 2,6-lutidine with which it is commonly associated as ordinarily prepared from coal tar.

We have found that by heating an impure 3-picoline, containing 4-picoline and/or 2,6-lutidine, and sometimes containing the contaminants even in predominating amount, with an organic-acid anhydride or organic-acid halide the contaminants are transformed by reaction with the organic-acid anhydride or organic-acid halide into complex non-volatile materials, while the 3-picoline remains substantially unattacked by the organic acid anhydride or organic-acid halide. By "halide" as used in the present specification and claims, we include chloride, bromide, and iodide, but exclude fluoride.

By this selective reaction with the organic-acid anhydride or organic-acid halide, we change the mixture from one in which the components are very difficult to separate one from another, due to their close resemblance in physical and chemical properties, into one in which the components are very easy to separate one from another by common and simple methods, such for instance as distillation. That is, a mixture of 3-picoline with either or both of 4-picoline and 2,6-lutidine is difficult to separate into its components, to get 3-picoline in substantially pure form, because all these components boil at very nearly the same temperature (about 143–144° C.); but after the selective reaction with the organic-acid anhydride or halide that converts the 4-picoline and the 2,6-lutidine into the complex and non-volatile reaction products, those reaction products have quite different properties, both chemical and physical, from the remaining unattacked 3-picoline, so that separation of the 3-picoline from those reaction products of an organic-acid anhydride or halide with 4-picoline and 2,6-lutidine may readily be effected by physical and chemical means.

No precise temperature is necessary for the reaction; but a temperature above 100° C. is desirable.

We prefer to carry out the reaction at about the boiling point of 3-picoline at atmospheric pressure (about 143–144° C.); for we can obtain and maintain these conditions readily by the use of a reflux condenser. If a lower temperature is used the rate of reaction is slower, and if a higher temperature is used the rate of reaction is more rapid. Further, we may add a condensing catalyst to the reaction mixture to aid the reaction, such for instance as zinc chloride; but that is not necessary.

The following are examples of our process:

Example 1.—A mixture of 50 lbs. of phthalic anhydride and about 100 lbs. of a refined picoline cut containing approximately 82% of 3-picoline and 18% of 4-picoline is refluxed for about 24 hours, at atmospheric pressure. The phthalic anhydride reacts with the 4-picoline, though very little if at all with the 3-picoline, to form a non-volatile reaction product. After the reaction we can readily separate the unreacted base from the reaction product. This may be done by distilling the mixture, to distill off the unreacted base and leave the reaction product as a residue; or may be done by neutralizing the reaction mixture, as by adding sufficient dilute caustic soda or soda ash, distilling off a mixture of water and 3-picoline, and recovering the 3-picoline from the distillate in known manner. Upon such a distillation we get a greatly purified 3-picoline, of about 95% purity.

Example 2.—A mixture of 50 to 75 lbs. of phthalic anhydride and about 100 lbs. of a refined picoline cut containing approximately 84% of 3-picoline and 16% of 2,6-lutidine is refluxed for about 24 hours at atmospheric pressure. The phthalic anhydride reacts with the 2,6-lutidine, though very little if at all with the 3-picoline, to form a non-volatile reaction product. The unchanged 3-picoline is separated from the reaction product as in Example 1.

Example 3.—A mixture of 200 to 250 lbs. of phthalic anhydride, 100 lbs. of a refined 3-picoline cut containing approximately 45% of 3-picoline, 33% of 4-picoline, and 22% of 2,6-lutidine, and 160 lbs. of a diluent (such as xylene), is refluxed for about 36 to 48 hours at atmospheric pressure. Here the phthalic anhydride reacts with both the 4-picoline and the 2,6-lutidine, but very little if at all with the 3-picoline. The unchanged 3-picoline is suitably separated from the reaction product; as by treating with hydrochloric acid, steam-distilling off xylene, neutralizing with soda ash, and then steam-distilling off the purified 3-picoline as in Example 1.

Example 4.—In place of the phthalic anhydride of Examples 1 to 3 we can use molecular-equivalent quantities of other organic-acid anhydrides and acid halides, including (by way of example) the following:

Stearic anhydride
Butyric anhydride
Acetic anhydride
Acetyl chloride
Acetyl bromide
Acetyl iodide
Benzoyl chloride
p-Toluenesulfonyl chloride If desired, a condensation catalyst may be added to the reaction. For instance, zinc chloride may be added when acetic anhydride is used.

Some of the organic-acid anhydrides show some tendency to react with themselves under the above reaction conditions, as well as with 4-picoline and 2,6-lutidine. An instance of this is maleic anhydride. While these organic-acid anhydrides can be used in our process, we consider them less desirable than those in which this tendency is very small or does not exist at all.

We claim as our invention:

1. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid anhydrides and aliphatic and aromatic organic-acid halides, and separating the unreacted 3-picoline from reaction products.

2. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid anhydrides and aliphatic and aromatic organic-acid halides, and separating the unreacted 3-picoline from reaction products by distillation.

3. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid anhydrides and aliphatic and aromatic organic-acid halides at atmospheric pressure, and separating the unreacted 3-picoline from reaction products.

4. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid anhydrides and aliphatic and aromatic organic-acid halides, and separating the unreacted 3-picoline from reaction products.

5. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid anhydrides, and separating the unreacted 3-picoline from reaction products.

6. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid anhydrides, and separating the unreacted 3-picoline from reaction products by distillation.

7. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid anhydrides at atmospheric pressure, and separating the unreacted 3-picoline from reaction products.

8. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid anhydrides, and separating the unreacted 3-picoline from reaction products.

9. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid halides, and separating the unreacted 3-picoline from reaction products.

10. The process of purifying 3-picoline that is contaminated by the co-presence of at least one of the bases 4-picoline and 2,6-lutidine, which consists in heating the contaminated 3-picoline with a compound of the class consisting of aliphatic and aromatic organic-acid halides, and separating the unreacted 3-picoline from reaction products by distillation.

11. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid halides at atmospheric pressure, and separating the unreacted 3-picoline from reaction products.

12. The process of purifying 3-picoline that is contaminated by the co-presence of at least one of the bases 4-picoline and 2,6-lutidine, which consists in refluxing the contaminated 3-picoline with a compound of the class consisting of aliphatic and aromatic organic-acid halides, and separating the unreacted 3-picoline from reaction products.

13. The process of purifying 3-picoline that is contaminated by the co-presence of at least one of the bases 4-picoline and 2,6-lutidine, which consists in heating the contaminated 3-picoline with phthalic anhydride, and separating the unreacted 3-picoline from reaction products.

14. The process of purifying 3-picoline that is contaminated by the co-presence of at least one of the bases 4-picoline and 2,6-lutidine, which consists in heating the contaminated 3-picoline with acetic anhydride, and separating the unreacted 3-picoline from reaction products.

15. The process of purifying 3-picoline that is contaminated by the co-presence of at least one of the bases 4-picoline and 2,6-lutidine, which consists in heating the contaminated 3-picoline with acetyl chloride, and separating the unreacted 3-picoline from reaction products.

16. The process of purifying 3-picoline that is contaminated by the co-presence of at least one of the bases 4-picoline and 2,6-lutidine as set forth in claim 1, with the addition that the heating is done in the presence of a condensation catalyst.

17. The process of purifying 3-picoline that is contaminated by the co-presence of at least one of the bases 4-picoline and 2,6-lutidine, which comprises heating the contaminated 3-picoline with phthalic anhydride, and separating the unreacted 3-picoline from the reaction products.

FRANCIS E. CISLAK.
WILLIAM R. WHEELER.

REFERENCES CITED

The following references are of record in the file of this patent:

Maier, "Das pyridin und Siener Derivative," 1934, pp. 31, 35, 46–49.